(12) United States Patent
Mohler

(10) Patent No.: US 7,880,410 B2
(45) Date of Patent: Feb. 1, 2011

(54) ROTARY, LIMITED ROTATION BI-DIRECTIONAL, DIRECT CURRENT ACTUATOR

(75) Inventor: David B. Mohler, Tipp City, OH (US)

(73) Assignee: Saia-Burgess, Inc., Vandalia, OH (US)

( * ) Notice: Subject to any disclaimer, the term of this patent is extended or adjusted under 35 U.S.C. 154(b) by 379 days.

(21) Appl. No.: 12/051,478

(22) Filed: Mar. 19, 2008

(65) Prior Publication Data

US 2008/0238348 A1    Oct. 2, 2008

Related U.S. Application Data

(60) Provisional application No. 60/907,121, filed on Mar. 21, 2007.

(51) Int. Cl.
*H02K 33/16* (2006.01)

(52) U.S. Cl. ............................ 318/119; 318/159

(58) Field of Classification Search ............ 318/119, 318/159, 686; 310/36, 37, 38, 67 R, 68 R, 310/68 B See application file for complete search history.

(56) References Cited

U.S. PATENT DOCUMENTS

| | | | |
|---|---|---|---|
| 2,449,901 A | | 9/1948 | Kaiser |
| 3,767,992 A | * | 10/1973 | Edwards et al. ............ 318/640 |
| 3,771,489 A | * | 11/1973 | Pearson ..................... 116/330 |
| 3,840,872 A | * | 10/1974 | Theilheimer ................. 341/2 |
| 4,129,844 A | | 12/1978 | Wells |
| 4,142,149 A | * | 2/1979 | Nador ....................... 324/157 |
| 4,186,332 A | * | 1/1980 | Montagu ................... 318/128 |
| 4,500,861 A | * | 2/1985 | Nelson ...................... 335/253 |
| 4,845,424 A | * | 7/1989 | Gamble .................... 324/146 |
| 5,337,030 A | | 8/1994 | Mohler |

OTHER PUBLICATIONS

Data Sheet from Takano Co. Ltd., Nagano, Japan, "Bistable Rotary Solenoid", RSR20 Series, No. RSR20/20-CABO, Date: before 2005.
International Search Report and Written Opinion mailed Jun. 25, 2008 in corresponding PCT application PCT/US08/03626.
International Preliminary Report on Patentability mailed Oct. 1, 2009 in corresponding PCT Application No. PCT/US2008/003626.

* cited by examiner

*Primary Examiner*—Bentsu Ro
(74) *Attorney, Agent, or Firm*—Nixon & Vanderhye, P.C.

(57) ABSTRACT

An actuator (20) comprises a rotor (22); an electromagnetic circuit (24) configured to produce bidirectional torque on the rotor; and, a rotation limitation assembly (26). The rotor (22) comprises a rotor shaft and plural magnets (80) affixed to the rotor shaft. In an example embodiment the rotation limitation assembly (26) comprises at least one stationary clockwise boundary (40) configured to limit clockwise rotation of the rotor (22); at least one stationary counterclockwise boundary (42) configured to limit counterclockwise rotation of the rotor (22); and a rotor stop arm (50) connected to the rotor and configured to selectively abut the clockwise boundary (40) and the counterclockwise boundary (44) and thereby limit the rotation of the rotor to a predetermined angle about an axis of the rotor shaft.

19 Claims, 5 Drawing Sheets

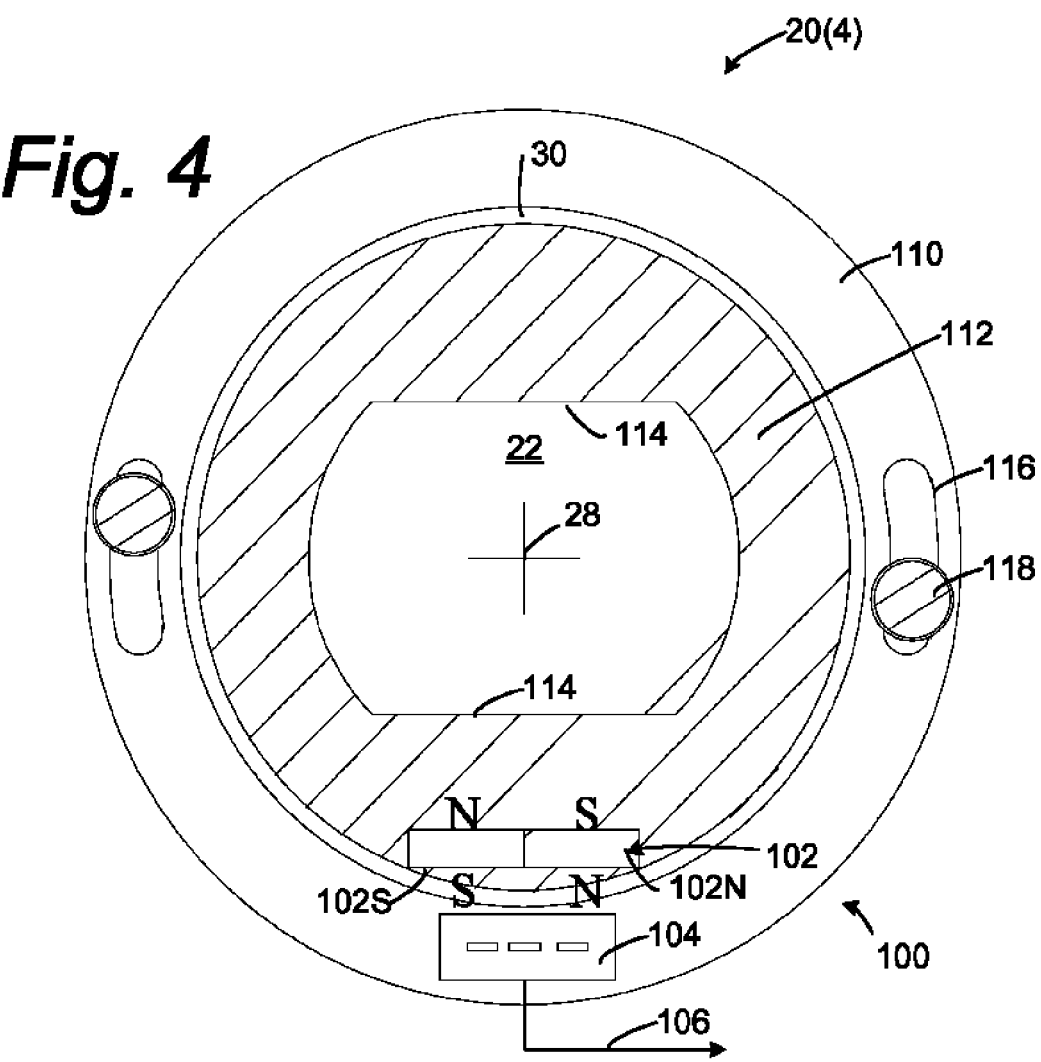
Fig. 4
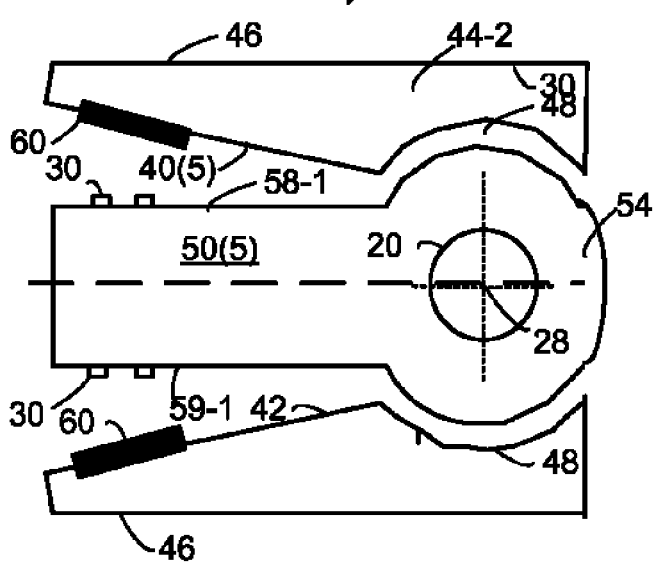
Fig. 5
Fig. 7

ROTARY, LIMITED ROTATION BI-DIRECTIONAL, DIRECT CURRENT ACTUATOR

This application claims the priority and benefit of U.S. Provisional Patent Application 60/907,121, filed Mar. 21, 2007, entitled "Rotary, Limited Rotation Bi-Directional, Direct Current Actuator", which is incorporated herein by reference in its entirety.

BACKGROUND

I. Technical Field

This invention pertains to the field of electromagnetically operated actuators, and particularly to rotary actuators which provide limited bidirectional rotation.

II. Related Art and Other Considerations

A rotary actuator typically comprises a rotor shaft to which an inertial load can be connected or coupled for actuating (e.g., rotating) the load. Often the rotor shaft is rotated by electromagnetic means, e.g., electrical induction of a magnetic field causes traction and/or repulsion of magnetic elements to create a torque on the rotor shaft.

Some types of rotary actuators are bidirectional, meaning that a change in direction of the magnetic fields can cause the rotor shaft to rotate clockwise for a period of time and then counterclockwise for another period of time.

For some types of rotary actuators it is preferably that the extent of rotational motion in one or more directions (e.g., either clockwise or counterclockwise) be limited. However, precision in the limitation of rotational motion can be problematic.

BRIEF SUMMARY

An actuator comprises a rotor; an electromagnetic circuit configured to produce bidirectional torque on the rotor; and, a rotation limitation assembly. In some example embodiments, the rotor comprises a rotor shaft and plural magnets affixed to the rotor shaft.

In an example embodiment the rotation limitation assembly comprises at least one stationary clockwise boundary configured to limit clockwise rotation of the rotor; at least one stationary counterclockwise boundary configured to limit counterclockwise rotation of the rotor; and a rotor stop arm connected to the rotor and configured to selectively abut the clockwise boundary and the counterclockwise boundary and thereby limit the rotation of the rotor to a predetermined angle about an axis of the rotor shaft.

Rebound of the abutting of the rotor stop arm against the boundaries is dampened by providing a rebound dampener, e.g., rebound dampening means. The rebound dampening means can comprise features on the rotor stop arm and/or on the boundary(ies), and in addition rebound dampening can be facilitated by a position sensor assembly.

The at least one stationary counterclockwise boundary and the at least one stationary clockwise boundary each comprise a first rebound dampening means. The rotor stop arm comprises at least one clockwise leading surface and at least one counterclockwise leading surface, wherein both the clockwise leading surface and the counterclockwise leading surface comprise second rebound dampening means. The first rebound dampening means and the second rebound dampening means are configured and positioned to for an at least partially embedding relationship in which one of the rebound dampening means at least partially penetrates or embeds into the other rebound dampening means. The rebound dampening means can take the form of an elastomeric pad on one of the contacting members (on one of the rotor stop arm and the boundaries) and one or more protrusions on the other of the contacting members (the other of the rotor stop arm and the boundaries).

In one example embodiment, the stationary counterclockwise boundary(ies) and the stationary clockwise boundary(ies) each comprise an elastomeric pad. The rotor stop arm comprises at least one clockwise leading surface and at least one counterclockwise leading surface. Both the clockwise leading surface(s) and the counterclockwise leading surface(s) comprise at least one protrusion. The protrusion(s) on the clockwise leading surface(s) is/are configured and positioned to at least partially embed in the elastomeric pad(s) on the stationary clockwise boundary(ies). Similarly, protrusion(s) on the counterclockwise leading surface(s) is/are configured and position to at least partially embed in the elastomeric pad(s) on the stationary counterclockwise boundary(ies).

In another example embodiment, the stationary counterclockwise boundary(ies) and the stationary clockwise boundary(ies) each comprise one or more protrusions. The rotor stop arm comprises at least one clockwise leading surface and at least one counterclockwise leading surface. In this other example embodiment, both the clockwise leading surface(s) and the counterclockwise leading surface(s) comprise an elastomeric pad. The protrusion(s) on the boundary(ies) is/are configured and positioned to at least partially embed in the elastomeric pad(s) on the rotor stop arm.

In an example implementation, there are two stationary counterclockwise boundaries and two stationary clockwise boundaries. In this example implementation, the rotor stop arm comprises an elongated arm member comprising an arm first segment extending laterally on a first side of the rotor and an arm second segment extending laterally on a second side of the rotor. The rotor stop arm further comprises two clockwise leading surfaces, a first of the clockwise leading surfaces being on the arm first segment and a second of the clockwise leading surfaces being on the arm second segment. Likewise, the rotor stop arm further comprises two counterclockwise leading surfaces, a first of the counterclockwise leading surfaces being on the arm second segment and a second of the counterclockwise leading surfaces being on the arm first segment. Each of the boundaries comprises a rebound dampening member in the form of an elastomeric pad or one or more protrusions.

In another embodiment, the rotor stop arm comprises: a clockwise leading surface on the arm first segment; a counterclockwise leading surface on the arm first segment; a clockwise leading surface on the arm second segment; and, a counterclockwise leading surface on the arm second segment. Each leading surface comprises rebound dampening means.

In an example implementation, the rotor, the at least one stationary clockwise boundary, and the at least one stationary counterclockwise boundary are configured whereby the predetermined angle is about twenty-nine degrees.

In an example implementation, the electromagnetic circuit is a direct current electromagnetic circuit comprising at least one coil arranged about at least one pole, the at least one coil being alternately polarized to alternately induce torque in the clockwise direction and the counterclockwise direction.

Another example embodiment of an actuator comprises a rotor, an electromagnetic circuit configured to produce bidirectional torque on the rotor; and a rotation limitation assembly configured to limit rotation of the rotor to a predetermined angle about an axis of the rotor shaft; and a position sensor assembly. The position sensor assembly is configured to sense rotational position of the rotor shaft, an in an example embodiment comprises a magnet assembly carried by the rotor shaft and a magnetic field sensor. The magnet assembly is configured to provide a north polarized face or a south polarized face to the magnetic field sensor in accordance with the rotational position of the rotor shaft. The magnetic field sensor is configured to generate a bi-stable output signal in accordance with polarization detected from the magnet assembly. The bi-stable output can be used by the electromagnetic circuit for producing the bidirectional torque in such a way as to, e.g., dampen the rebound of the abutting of the rotor stop arm against the boundaries.

In an example implementation, the position sensor assembly further comprises a sensor carrier upon which the magnetic field sensor is mounted. The sensor carrier is configured to be adjustably positioned about the axis of the rotor shaft to permit calibration of a switching point of the bi-stable output of the magnetic field sensor relative to the rotational position of the rotor shaft.

In an example implementation, the position sensor assembly further comprises a magnet assembly carrier upon which the magnet assembly is mounted. The magnet assembly carrier is keyed to the rotor shaft.

In another aspect the technology includes a method of operating an actuator. The method comprises (1) using an electromagnetic circuit to rotate a rotor in bidirectional manner by application of bidirectional torque to the rotor, the bidirectional torque being generated by switching direction of current in the electromagnetic circuit; (2) limiting an extent of rotation of the rotor by providing at least one boundary member against which the rotor abuts when the rotor has rotated to a predetermined boundary angle; and (3) dampening rebound of the rotor upon the rotor abutting the boundary member. In one example implementation, dampening rebound of the rotor by comprises providing rebound dampening means on the rotor and the boundary member. In a same or separate implementation, dampening rebound of the rotor by comprises sensing rotational position of the rotor and controlling the switching of direction of the current in response to the rotational position.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a top view of a portion of the actuator of FIG. 1, showing particularly an example embodiment of a position sensor assembly comprising the actuator.

FIG. 5 is a top view of a portion of the actuator of FIG. 1, showing particularly another example embodiment of a rotation limitation assembly comprising an actuator.

FIG. 7 is a perspective view of an example inertial load suitable for attachment to a rotor shaft of an actuator according to an example embodiment.

DETAILED DESCRIPTION

Figure 1:
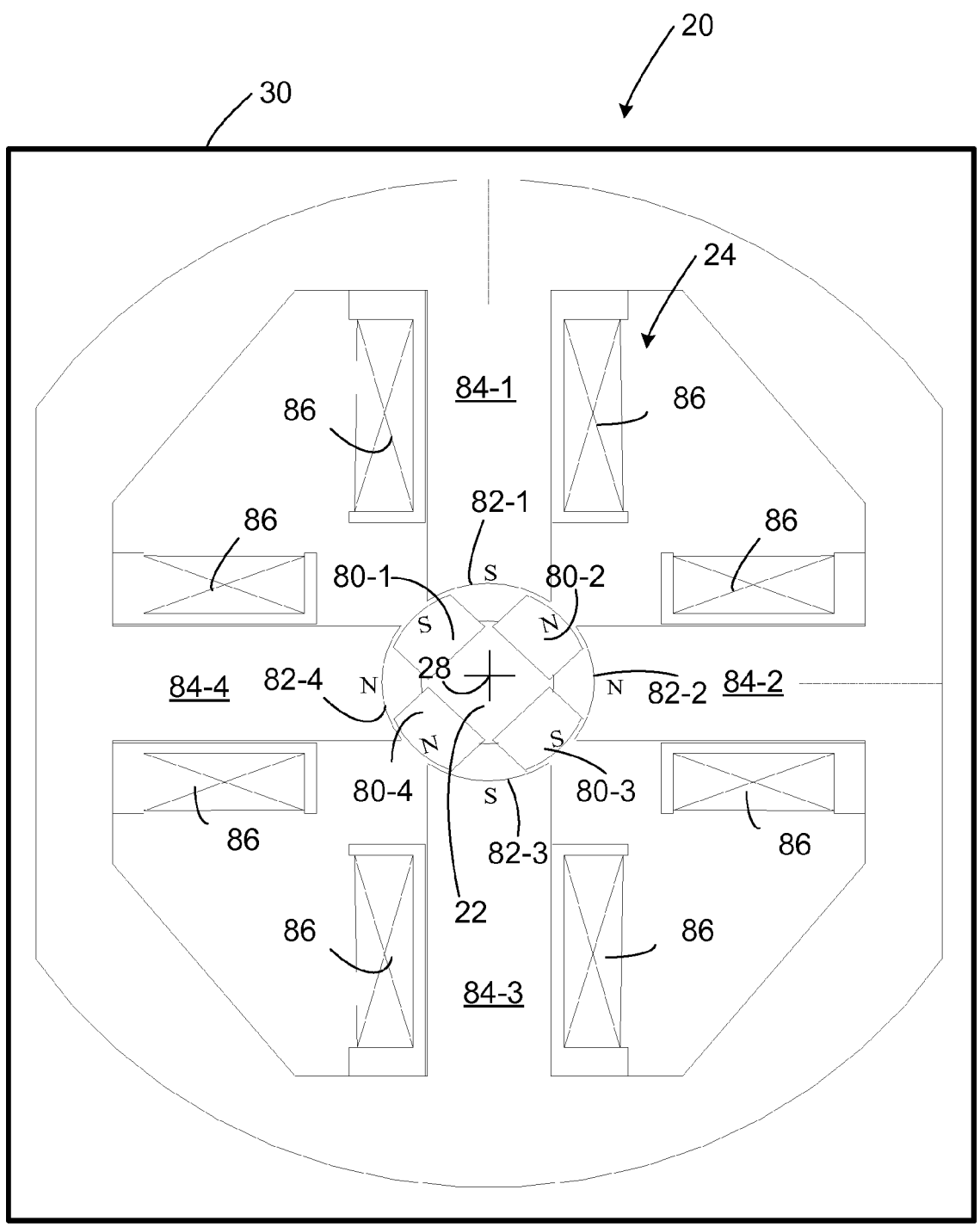
FIG. 1 is a top view of an actuator according to an example embodiment.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

FIG. 1-FIG. 4 show an example embodiment of a rotary, limited rotation, bi-directional, actuator 20. The actuator 20 comprises rotor 22; electromagnetic circuit 24; and rotation limitation assembly 26 (see FIG. 2A, FIG. 2B, and FIG. 3A). As explained hereinafter, electromagnetic circuit 24 is configured to produce bidirectional torque on rotor 22 about shaft axis 28. The rotation limitation assembly 26 is configured to limit the rotation of the rotor to a predetermined angle about axis 28 of rotor 22.

Figure 3:
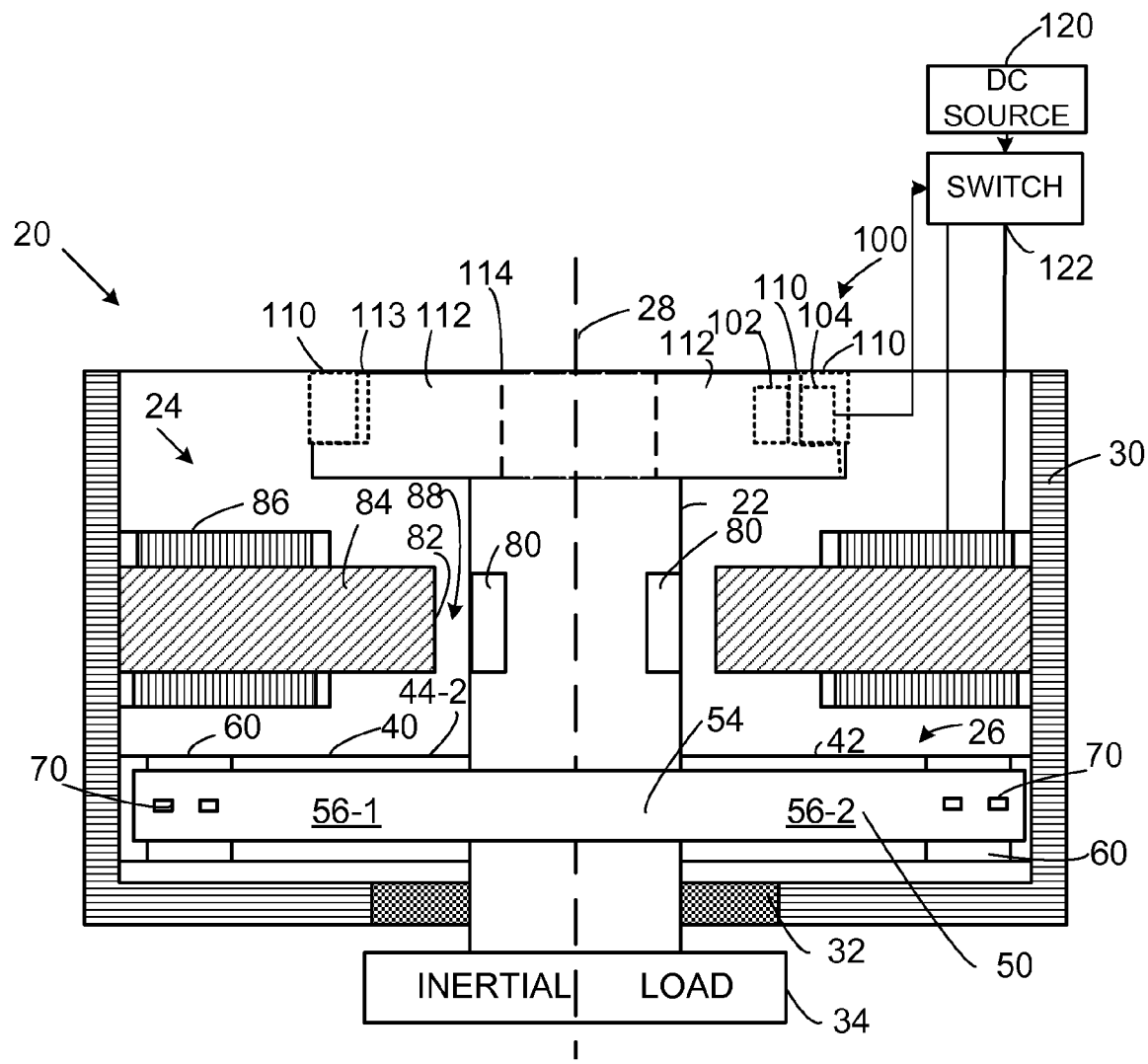
FIG. 3 is sectioned side view of the actuator of FIG. 1 taken along line 3-3 of FIG. 2A.

In an example embodiment, actuator 20 can be at least partially contained in a housing or frame, as depicted by housing 30 in FIG. 1. As shown in FIG. 3, a portion of rotor 22 can extend or protrude from housing 30. A bearing 32 or the like may be provided to facilitate rotatable protrusion of rotor 22 through housing 30. On its protruding end rotor 22 may engage or be connected to an inertial load 34. The nature of inertial load 34 depends on the environment or circumstances of employment of actuator 20.

Figure 2A:
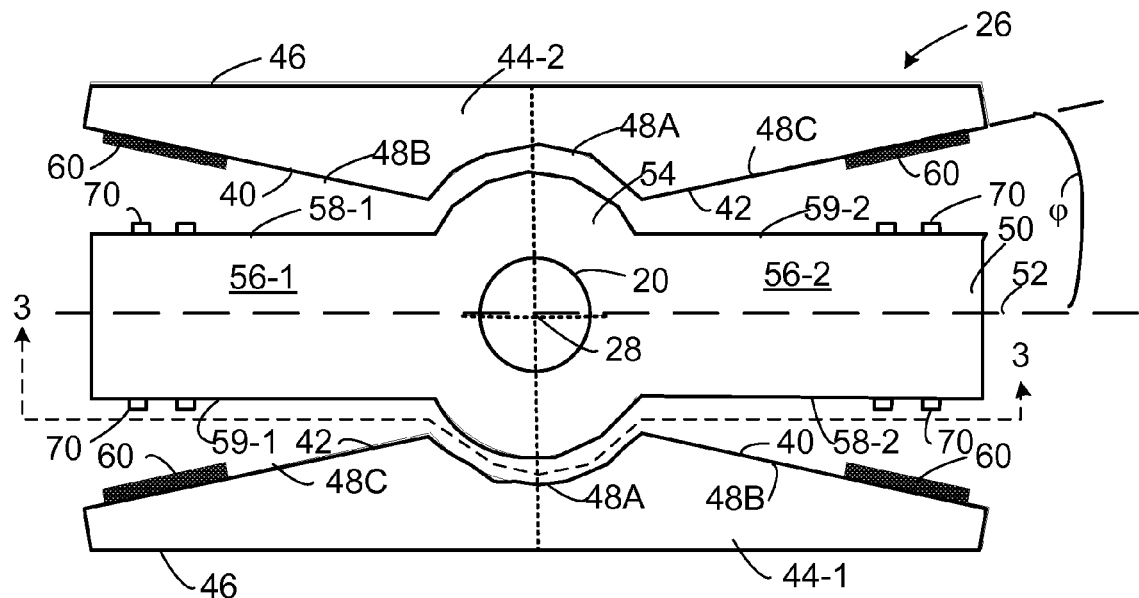
FIG. 2A is a top view of a portion of the actuator of FIG. 1, showing particularly an example embodiment of a rotation limitation assembly comprising the actuator.
Figure 2B:
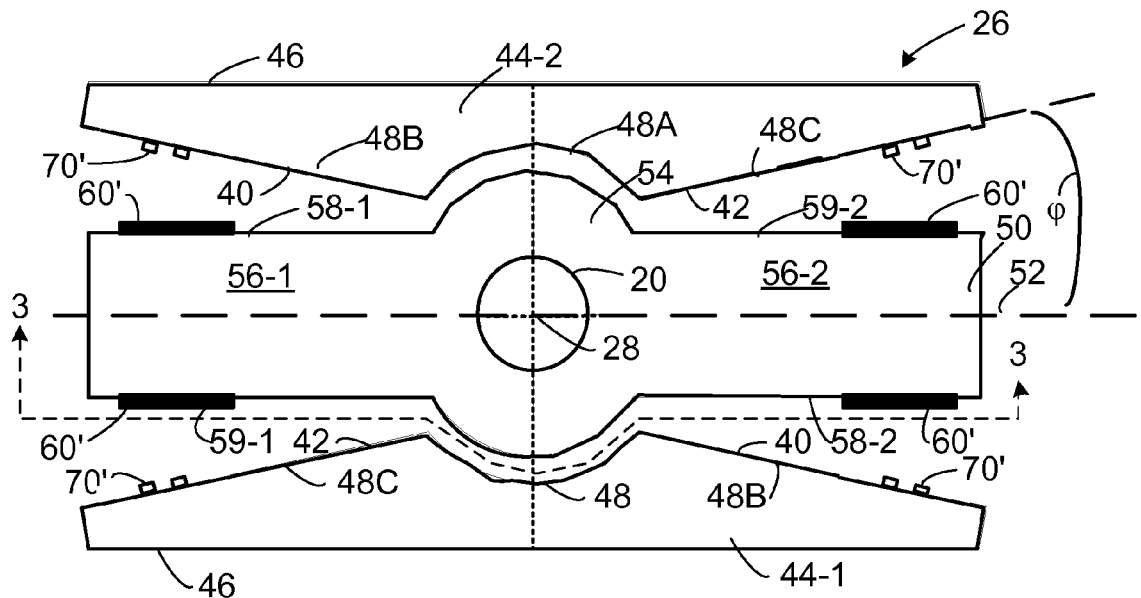
FIG. 2B is a top view of a portion of another actuator comprising another example embodiment of a rotation limitation assembly comprising the actuator

As shown in FIG. 2A and FIG. 2B, rotation limitation assembly 26 comprises at least one and preferably two stationary clockwise boundaries 40 which are configured to limit clockwise rotation of rotor 22, as well as at least one and preferably two stationary counterclockwise boundaries 42 configured to limit counterclockwise rotation of rotor 22. One of the stationary clockwise boundaries 40 and one of the stationary counterclockwise boundaries 42 are mounted on, carried by, or realized as surfaces of first boundary member 44-1; another one of the stationary clockwise boundaries 40 and one of the stationary counterclockwise boundaries 42 are mounted on, carried by, or realized as surfaces of second boundary member 44-2 (see FIG. 2A). In an example embodiment, each of first boundary member 44-1 and second boundary member 44-2 comprise a flat exterior or back wall 46 (by which the respective boundary member can be mounted, e.g., to housing 30).

Each of first boundary member 44-1 and second boundary member 44-2 also comprise an interior-facing wall 48. The interior-facing wall 48 has the general shape of a "V" but with a concavity at its vertex, and is formed by three segments 48A, 48B, and 48C. An intermediate, arc-shaped segment 48A of each interior-facing wall 48 is formed intermediate segments/surfaces 48B, 48C. The arc-shaped segment 48A provides the concavity at what otherwise would be the vertex of segments 48B, 48C. The segments 48B, 48C are angularly inclined in a manner to provide the "V" shape. The segments 48B, 48C provide the boundary 40 and boundary 42 for the respective boundary member. The intermediate, arc-shaped segment 48A of each boundary member 44 is formed to rotatably accommodate structure situated between the first boundary member 44-1 and second boundary member 44-2.

As shown in FIG. 2A, FIG. 2B, and FIG. 3, rotation limitation assembly 26 further comprises rotor stop arm 50. In the illustrated, example embodiment, rotor stop arm 50 comprises an elongated arm member having an axis 52 of elongation which is orthogonal to shaft axis 28. The rotor stop arm 50 comprises an arm central hub section 54 which is essentially concentric about rotor 22, and which is connected to or attached to the shaft of rotor 22. The rotor 22 further comprises arm first segment 56-1 extending laterally on a first side of rotor 22 and arm second segment 56-2 extending laterally on a second side of rotor 22. The rotor stop arm rotor stop arm 50 further comprises two clockwise leading surfaces 58-1 and 58-2 and two counterclockwise leading surfaces 59-1 and 59-2. A first of the clockwise leading surfaces, i.e., surface 58-1, is on arm first segment 56-1 and a second of the clockwise leading surfaces, i.e., surface 58-2, is on arm second segment 56-2. Likewise, a first of the counterclockwise leading surfaces, i.e., surface 59-1, is on arm second segment 56-2 and a second of the counterclockwise leading surfaces, i.e., surface 59-1, is on arm first segment 56-1.

The rotor stop arm 50, being connected to the rotor, is configured to abut the clockwise boundary 40 upon reaching full desired extent of clockwise travel, and to abut the counterclockwise boundary 42 upon reaching full desired extent of counterclockwise travel. In so doing, the rotor stop arm 50 and boundaries 40, 42 cooperate to limit the rotation of the rotor 22 to a predetermined angle about an axis of the rotor shaft (e.g., about shaft axis 28).

With rotor stop arm 50 now having been described, it is better understood that wall segments 48A of the boundary members 44-1 and 44-2 are formed in concave fashion at a vertex of the inclined segments 48B, 48C to rotatably accommodate central hub section 54 of rotor stop arm 50.

In alternate embodiments, a rotation limitation assembly, such as rotation limitation assembly 26(5) shown in FIG. 5, can comprise cantilever rotor stop arm 50(5) and one stationary clockwise boundary 40(5) and one stationary counterclockwise boundary 42(5). As such, rotor 22(5) has one clockwise leading surface 58-1 and one counterclockwise leading surface 59-1. The embodiment of FIG. 5 may be desirable for light inertial loads and to conserve space, but other applications or uses may be more robust and require the dual stops of the FIG. 2A, FIG. 2B type of embodiment.

Thus, the technology encompasses plural embodiments, with some embodiments comprising a rotor having one stop arm segment, one clockwise boundary and one counterclockwise boundary; and other embodiments having two stop arm segments, two clockwise boundaries and two counterclockwise boundaries. For this reason, collective reference is made hereinafter to both types of embodiments by usage of terms such as stationary clockwise boundary(ies) and stationary counterclockwise boundary(ies), clockwise leading surface(s) and counterclockwise leading surface(s) of rotor stop arm 50, for example.

Rebound of the abutting of the rotor stop arm 50 against the boundaries 44-1, 44-2 is dampened by providing rebound dampening means. The at least one stationary counterclockwise boundary 42 and the at least one stationary clockwise boundary 40 each comprise a first rebound dampening means. The rotor stop arm 50 comprises at least one clockwise leading surface 58 and at least one counterclockwise leading surface 59, wherein both the clockwise leading surface 58 and the counterclockwise leading surface 59 comprise second rebound dampening means. The first rebound dampening means and the second rebound dampening means are configured and positioned to for an at least partially embedding relationship in which one of the rebound dampening means at least partially penetrates or embeds into the other rebound dampening means. The rebound dampening means can take the form of an elastomeric pad on one of the contacting members (on one of the rotor stop arm and the boundaries) and one or more protrusions on the other of the contacting members (the other of the rotor stop arm and the boundaries).

Figures 8A, 8B:
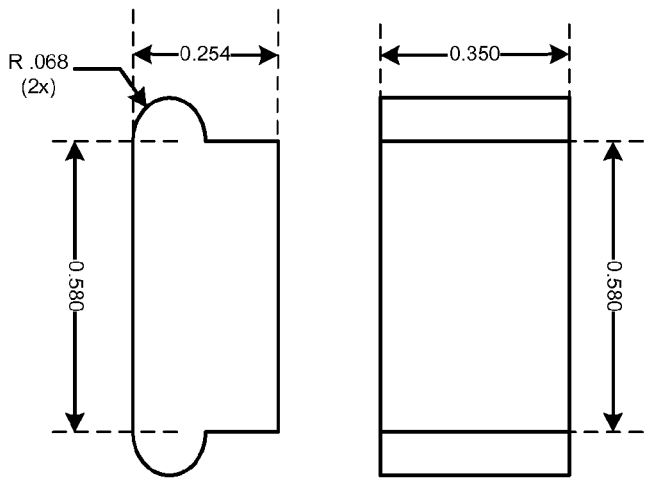
FIG. 8A is a side view of an elastomeric pad comprising an example embodiment of rebound dampening means.
FIG. 8B is a top view of the elastomeric pad of FIG. 8A.

In example embodiments such as that of FIG. 2A, the stationary clockwise boundary(ies) 40 and the stationary counterclockwise boundary(ies) 42 each comprise elastomeric pad 60 situated proximate a distal end(s) of the respective boundary member. FIG. 8A and FIG. 8B show an example embodiment of elastomeric pad 60 along with example dimensions therefore. The elastomeric pad 60 comprises a back portion which is preferably situated in a groove or channel of its respective boundary member, and a front portion which extends beyond an inward-facing surface of its respective boundary member. The elastomeric pad 60 can be retained in its groove or channel by any suitable conventional means, such as by an adhesive, for example. In a non-limiting, example implementation, elastomeric pad 60 is fabricated from an elastomer such as DuPont Viton, durometer 75 Shore A.

As mentioned above, rotor stop arm 50 comprises at least one clockwise leading surface 58-1 and at least one counterclockwise leading surface 58-2. In the FIG. 2A embodiment, both the clockwise leading surface(s) 58-1 and the counterclockwise leading surface(s) 58-2 comprise at least one protrusion 70, and preferably two spaced-apart protrusions 70. The protrusion(s) 70 on the clockwise leading surface(s) 58-1 is/are configured and positioned to at least partially embed in the elastomeric pad(s) 60 on the stationary clockwise boundary(ies) 40 and the protrusion(s) 70 on the counterclockwise leading surface(s) 58-2 is/are configured and position to at least partially embed in the elastomeric pad(s) 60 on the stationary counterclockwise boundary(ies) 42.

In example embodiments such as that of FIG. 2B, the stationary clockwise boundary(ies) 40 and the stationary counterclockwise boundary(ies) 42 each comprise one or more protrusions 70' situated proximate a distal end(s) of the respective boundary member. In the FIG. 2A embodiment, both the clockwise leading surface(s) 58-1 and the counterclockwise leading surface(s) 58-2 of the rotor stop arm 50 comprise elastomeric pads 60'. The protrusion(s) 70' on the boundary(iew) 40 and 42 is/are configured and positioned to at least partially embed in the elastomeric pad(s) 60' on the rotor stop arm 50. In similar manner as with the FIG. 2A embodiment, the elastomeric pad 60' comprises a back portion which is preferably situated in a groove or channel of its respective surface of the rotor stop arm 50, and a front portion which extends beyond an boundary-facing surface of the rotor stop arm 50. The elastomeric pad 60' can be retained in its groove or channel by any suitable conventional means, such as by an adhesive, for example.

The protrusions 70 of FIG. 2A and protrusions 70' of FIG. 2B can have various cross-sectional shapes, such as semi-cylindrical or any suitable polygon, such as quadrilateral, for example. Minimizing the rebound also involves selecting an appropriate elastomer type and hardnesses and as well as judicious selection of shape and size of the protrusions. In one example implementation, the protrusions are essentially spherical; e.g., steel balls embedded into the rotor stop arm or boundary member. Also, in conjunction with rebound dampening, and due to the reversible quality of the actuator, an electronic reversing torque of short duration can be used to slow the moment of impact. The position sensor assembly herein described can be used to signal the external electronics for applying the braking pulse to the actuator coils.

As mentioned above, rotor stop arm 50 comprises at least one clockwise leading surface 58-1 and at least one counterclockwise leading surface 58-2. In the FIG. 2A embodiment, both the clockwise leading surface(s) 58-1 and the counterclockwise leading surface(s) 58-2 comprise at least one protrusion 70, and preferably two spaced-apart protrusions 70. The protrusion(s) 70 on the clockwise leading surface(s) 58-1 is/are configured and positioned to at least partially embed in the elastomeric pad(s) 60 on the stationary clockwise boundary(ies) 40 and the protrusion(s) 70 on the counterclockwise leading surface(s) 58-2 is/are configured and position to at least partially embed in the elastomeric pad(s) 60 on the stationary counterclockwise boundary(ies) 42. A converse arrangement of protrusions 70' and pads 60' is provided in the FIG. 2B embodiment.

As mentioned above, rotation limitation assembly 26 is configured to limit the rotation of the rotor to a predetermined angle about axis 28 of rotor 22. In the particular example implementations shown in FIG. 2A, FIG. 2B, and FIG. 5, the rotor, the stationary clockwise boundary(ies), and the stationary counterclockwise boundary(ies) are configured whereby the predetermined angle $\phi$ is about twenty-nine degrees.

In an example implementation, the electromagnetic circuit 24 is a direct current electromagnetic circuit comprising at least one coil arranged about at least one pole, the at least one coil being alternately polarized to alternately induce torque in the clockwise direction and the counterclockwise direction. Further details of electromagnetic circuit 24 for example embodiments are described below.

FIG. 1 shows (from above) rotatable shaft 22 upon which there are four permanent magnets 80 affixed to rotate with the shaft of rotor 22. Magnets 80, more particularly labeled as magnets 80-1 through 80-4, are alternately polarized with the polarizations shown at the outer peripheries of the magnets. Likewise, four stationary pole faces 82 are shown at distal ends of cantilever pole members 84. The four pole members 84, more specifically labeled as pole members 84-1 through 84-4, are preferably equally angularly spaced about rotor 22 with proximal ends held stationary, e.g., by connection to housing 30. Each of the pole members 84 have conductive coils 86 wrapped thereabout, e.g., the coils 86 are circumferentially wrapped around the pole members 84. The pole members 84 and particularly the pole faces 82 are shown in FIG. 1 with polarizations as they might be due to the current flowing through their respective coils 86 to produce a counterclockwise torque on rotor 22. The pole faces 82 are radially shaped and the coils 86 surround each leg of the stationary poles 84 which are generally rectangular in cross-section and have a depth into the page of FIG. 1 of approximately 0.93 inches or other suitable depth as is fitting for the amount of torque required.

The stationary structure including the structure comprising pole members 84 is preferably of a ferritic material to provide a magnetic flux path. The shaft material of rotor 22 is likewise preferably ferritic, but may also be non-magnetic with an expected loss in torque and efficiency.

As illustrated in exaggerated fashion in FIG. 3, a radial air gap 88 is formed between the stationary pole faces 82 and the permanent magnets 80 for the transmission of magnetic flux between them and for rotational clearance. Two coils 86 are polarized to produce a magnetic south pole at the air gap 88 and two coils 86 are polarized to produce a magnetic north pole at the air gap 88. Due to polarizations of the permanent magnets 80 at the air gaps 88, a counterclockwise torque is developed on the magnets 80 (and therefore, the shaft of rotor 22) tending to align the marked north magnet surfaces with the south pole faces. Likewise, torque in the same direction is induced due to the marked south magnet surfaces being attracted to the north pole faces. In addition, a torque is induced on the magnets 80 having the same direction of torque as just described due to the repelling forces of like-polarized magnet and pole pairs.

Reversal of the induced torque is effected by the electromagnetic circuit 24 reversing the currents in all of the coils 86 whereby the stationary pole faces 82 will have polarities opposite to those as shown in FIG. 1. The resultant tractive and repelling forces will then reverse to effect a clockwise torque. Although each coil 86 could be independently controlled to give varying degrees of magnetic effect, a preferred embodiment would employ coils 86 which are connected in series but with winding directions such as to produce the alternately polarized conditions. Alternatively, the coils 86 can be connected in parallel, or any suitable arrangement of series and parallel connections. It will be apparent that a suitable number of coil turns and resistance for each coil is dependent upon the method of interconnection selected.

Because the rotational capability can exceed the desired limits of rotation, a method for stopping the rotation between fixed bounds is employed using the rotation limitation assembly 26. FIG. 2A shows a simplified schematic illustration of a stop-arm 50 rigidly affixed to the rotatable shaft 22 and four stationary elastomeric pads 70 against which the stop arm features (e.g., leading surfaces 58-1 and 58-2) stop.

FIG. 2A also looks down on the rotatable shaft 22 and is shown with the stop arm 50 at mid-stroke. Fixed elastomeric pads 70 are shown at four locations and are bonded and/or engaged into locking channels on stationary clockwise boundary(ies) 40 and stationary counterclockwise boundary(ies) 42 to prevent their dislocation during actuation of the device. The stop arm 50 is shown having eight small protrusions 60 located such that any four protrusions 60 will be the first surfaces to make contact with the elastomers 70 at the end of the rotational stroke. The relatively small surface areas of the protrusions 70 will provide a de-accelerating rate less than would be effected if the full flat area of the stop arm made first contact.

The net desired result of rotation limitation assembly 26 is to limit or prevent a rebound of the stop arm 50 and the inertia load 34 (which is affixed to the shaft either as shown in FIG. 3 or elsewhere). Due to some degree of elasticity of the elastomeric stop pads 60, the stop arm 50 will to some extent embed the protrusions 70 into the pads 60 and bring the shaft of rotor 22 to a rotational stop.

In an example embodiment, actuator 20 provides high torque, high speed rotary actuation over a rotation angle of about 29°. This allows a large moment of inertia (load) to be rotated in an over and back cycle in about 30 milliseconds per motion.

In another of its aspects, and as shown generally in FIG. 3 and FIG. 4, an example embodiment of an actuator comprises position sensor assembly 100. The position sensor assembly 100 can be used to signal the external electronics for applying the braking pulse to the actuator coils, and thereby (due to the reversible quality of the actuator) assist with rebound dampening. The aspect of position sensor assembly 100 can, at least in some embodiments, be separate and distinct from other elements/assemblies of actuator 20 as previously described, but is shown in FIG. 3 as being a further feature for/to the actuator 20 of the embodiment of FIG. 1, FIG. 2A, and FIG. 2B. As such, the actuator 20(4) of FIG. 4 comprises elements which are common to and similarly numbered as elements of actuator 20 of the previous embodiments, including but not limited to rotor 22, electromagnetic circuit 24, and (optionally) rotation limitation assembly 26.

The position sensor assembly 100 is configured to sense rotational position of the shaft of rotor 22. In an example embodiment shown in FIG. 3 and FIG. 4, position sensor assembly 100 comprises magnet assembly 102 carried by the shaft of rotor 22 and magnetic field sensor 104. The magnet assembly 102 is configured to provide a north polarized face 102N or a south polarized face 102S to the magnetic field sensor 104 in accordance with the rotational position of the shaft of rotor 22. The magnet assembly 102 is thus configured with a north polarized face 102N and a south polarized face 102S positioned adjacent one another proximate a circumferential surface that faces magnetic field sensor 104. The magnetic field sensor 104 is configured to generate a bi-stable output signal (for application on output signal line 106) in accordance with polarization detected from the magnet assembly 102. The bi-stable output can be used by the electromagnetic circuit for producing the bidirectional torque in such as way as to, e.g., dampen the rebound of the abutting of the rotor stop arm 50 against the boundary(ies) 44-1 and/or 44-2. Construction geometries place magnet assembly 102 and magnetic field sensor 104 in relative locations to nearly set the switch point of magnetic field sensor 104 at mid-stroke of rotor stop arm 50 (e.g., in the position shown in FIG. 2A and FIG. 2B wherein rotor stop arm 50 is essentially equidistant between boundary(ies) 44-1 and/or 44-2).

In an example implementation, position sensor assembly 100 further comprises sensor carrier 110 upon which magnetic field sensor 104 is mounted. The sensor carrier 110 is configured to be adjustably positioned about the axis 289 of the shaft of rotor 22 to permit calibration of a switching point of the bi-stable output of the magnetic field sensor 104 relative to the rotational position of the rotor shaft.

In an example implementation, position sensor assembly 100 further comprises magnet assembly carrier 112 upon which magnet assembly 104 is mounted. Magnet assembly carrier 112 is keyed to rotor shaft. In this regard, FIG. 3 also looks down on the rotatable shaft of rotor 22, and particularly shows the shaft of rotor 22 as being provided with flats 114 for the purpose of keying to 122 (the magnet assembly carrier 112 is shown as cross hatched in FIG. 4). In FIG. 4 both the shaft of rotor 22 and magnet assembly carrier 112 are shown at the mid-stroke of the actuator. The magnet assembly 102 is held by magnet assembly carrier 112 to rotate with rotor 22 and the shaft during normal rotation of the actuator.

The magnet assembly 102 is magnetized such as to create both north face 102N and south face 102S on each of its two principal faces. Surrounding the magnet assembly carrier 112 is sensor carrier 110 that houses magnetic field sensor 104. In an example 3 mb magnetic field sensor 104 can be, for example, a Hall Effect Sensor, which is preferably a small electrical semiconductor device. The magnetic field sensor 104 is a bi-state output device which signals (on line 106 to the remainder of electromagnetic circuit 24) a high or low voltage output depending upon whether magnetic field sensor 104 detects a north magnetic field or a south magnetic field.

As also shown in FIG. 4, sensor carrier 110 is concentric about magnet assembly carrier 112, being separated by a slight radial gap 113. The sensor carrier 110 is rotatably adjustable over a few degrees to permit an accurate calibration of a switching point of the magnetic field sensor 104 relative to the position of the shaft of rotor 22 and the sensor magnet. The calibration positioning is accomplished, at least in an example embodiment, by arcuate adjustment grooves 116 provided in sensor carrier 110 and radially spaced away from a circumferential edge of sensor carrier 110, as well as fasteners 118 (such as set screws) which selectively loosen and tighten sensor carrier 110 relative to magnet assembly carrier 112. Upon completion of the calibration, the sensor carrier 110 is locked into position by means of fasteners 118 (e.g., hold-down screws) as illustrated in FIG. 4. It is understood that a variety of magnet carrier and sensor carrier configurations would provide the same sensor effect. For instance, the magnet assembly 102, instead of being rectangular as shown in FIG. 4, could be in the form of a cylindrical ring mounted concentrically with the axis of rotation and radially magnetized to provide a north-south interface as shown for the rectangular magnet. As implied, the sensor can be adjusted to provide an output signal transition at any desired position of rotation.

Figure 6:
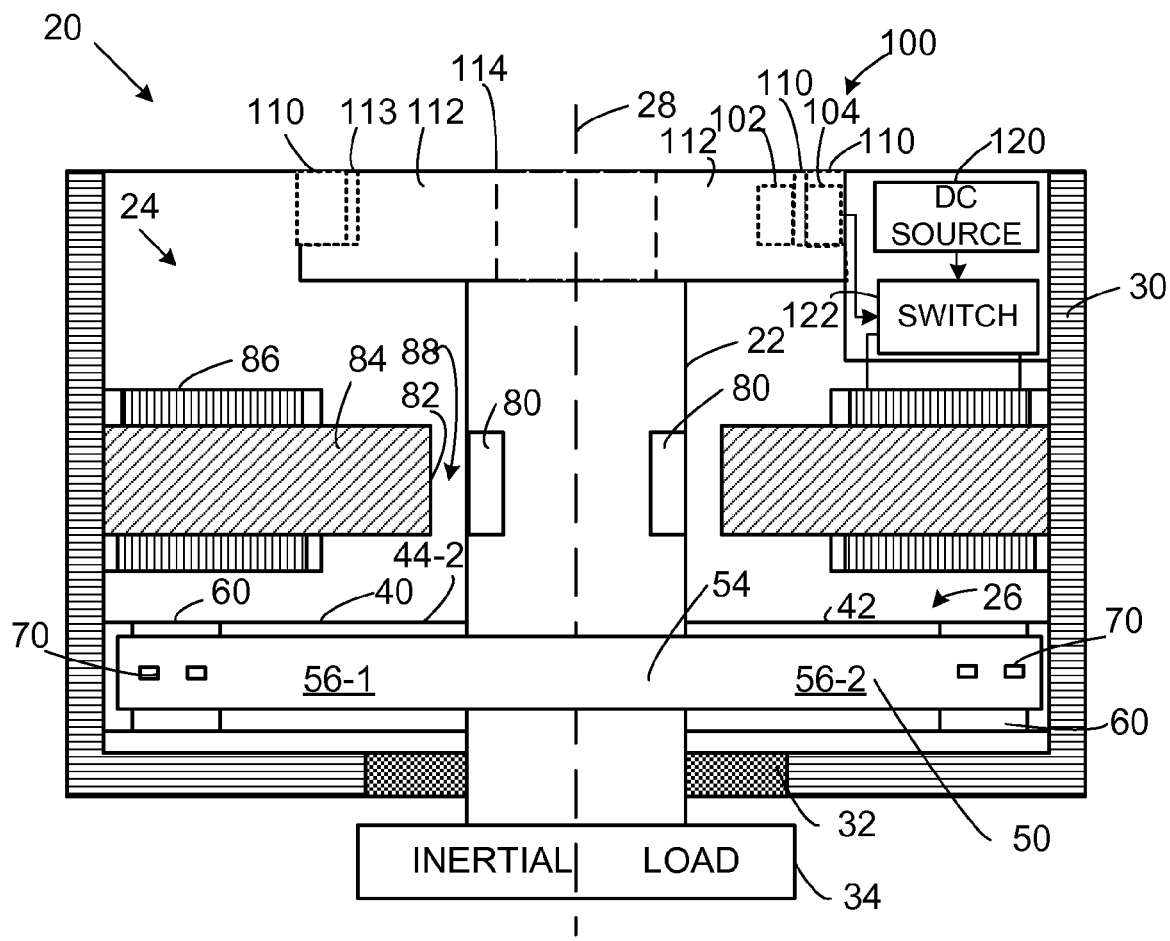
FIG. 6 is sectioned side view of an actuator such as that of FIG. 1 and taken along line 3-3 of FIG. 2A, but having further aspects of an electromagnetic circuit placed internal to the actuator.

FIG. 3 shows further example circuit elements which can be used supplementary with or in conjunction with electromagnetic circuit 24, including DC current source 120 (from which current is obtained for supply to conductive coils 86) as well as current direction switch 122 (which is responsible for switching the direction of current applied to the conductive coils 86 in the aforementioned manner(s)). FIG. 3 further shows that output signal line 106 from magnetic field sensor 104 is applied to current direction switch 122 to provide the timing for the change/switch of current direction in conductive coils 86. In one example embodiment shown in FIG. 3, the DC current source 120 and current direction switch 122 are provided exterior to the actuator, e.g., exist outside of actuator housing 30. In another example embodiment, shown in FIG. 6, the DC current source 120 and current direction switch 122 are provided inside actuator housing 30.

In the example embodiments, a stationary direct current (D.C.) electromagnetic circuit 24 acts in concert with permanent magnets 80 attached to a rotatable shaft of rotor 22 to rotationally accelerate the shaft and its attached inertia load 34 through a fixed angle $\phi$ of displacement. The magnetic field produced by the electromagnetic circuit 24 produces a torque on the permanent magnet assembly attached to the shaft of rotor 22 due to the magnetic attraction of the magnets 80 to the electromagnetic pole pieces 82 as well as a repulsive torque on the permanent magnet assembly to the same magnets 80 but in a torque direction aiding the first said torque.

The stationary electromagnetic circuit 24 contains one or an even numbered plurality of electrical coils 86. The conductive coils 86 induce a magnetic field into their respective stationary, ferritic, pole pieces 84. The magnetic polarity for each pole piece 84 is dependent upon the direction of current in its attendant coil 86, the direction of current being controlled by an electromagnetic circuit 24 (see FIG. 3). The permanent magnets 80 affixed to the rotatable shaft of rotor 22 have a fixed direction of magnetization (polarity) and, if more than one, are alternately polarized relative to any adjacent magnet(s). The relative geometries of the stationary poles 84 and magnets 80 and their proximities to each other are significant attributes of an efficient electromagnetic device as are readily recognized in the art.

Other features of the technology relate to position sensor assembly 100, and particularly to electronic signalling of the mid-point of rotation for purposes of de-accelerating the rotating load by means of reversing the currents in conductive coils 86.

In another aspect the technology includes a method of operating an actuator. The method comprises (1) using an electromagnetic circuit to rotate a rotor in bidirectional manner by application of bidirectional torque to the rotor, the bidirectional torque being generated by switching direction of current in the electromagnetic circuit; (2) limiting an extent of rotation of the rotor by providing at least one boundary member against which the rotor abuts when the rotor has rotated to a predetermined boundary angle; and (3) dampening rebound of the rotor upon the rotor abutting the boundary member. In one example implementation, dampening rebound of the rotor by comprises providing rebound dampening means on the rotor and the boundary member. In a same or separate implementation, dampening rebound of the rotor by comprises sensing rotational position of the rotor and controlling the switching of direction of the current in response to the rotational position.

FIG. 7 illustrates an example inertial load suitable for attachment to a rotor shaft of an actuator according to an example embodiment. The particular example inertial load of FIG. 7 is found in the environment of a postal sorter in which the moving inertial load is a plastic (or other) diverter vane which directs the path of mail according to the position of the actuator. Although the vane can be quite detailed, FIG. 7 provides a representative illustration of a vane of simple shape and suitable moment of inertia and resistance to air during rotation (windage area).

In the above regard, the example vane of FIG. 7 or a vane similar thereto or represented thereby can be employed for directing the path of postal items in high speed mail sorters. The sorter comprises a plurality of such actuators to separate unsorted mail into lots of sorted mail corresponding to their next mail route. The sorter system has such electronics, bar code readers, and computer programming as to cause the actuators of this invention to select appropriate paths within the sorter to sort the mail into common routing lots. The actuator, having two stable rotational positions, is always directing the mail into a valid path except during the time in which it is changing positions. The actuator must necessarily have a high switching speed between the two positions to achieve an efficient throughput of the total sorter. The high speed of the actuator can cause the actuator to bounce or rebound at the end of its rotational stroke and momentarily intersect the mail path and inadvertently misdirect a piece of mail. To minimize rebound, the internal stops of the actuator include elastomeric stops (such, e.g., the rebound dampening means described above) and a position sensor in the actuator. The position sensor provides a logic signal to the electronics when reaching mid-stroke so as to effect a short reversing or "braking" pulse to the actuator to reduce its end-of-stroke impact.

Whatever the use or field of application of actuators encompassed herein, it will be appreciated that various features that contributes to properties or phenomena such as magnetic strength, friction, and moment of inertia can influence the end speed of response of the actuator. Therefore, constituent elements and aspects of the actuator (magnets, coils, item sizes, sensor calibration, etc.) must be closely toleranced to be repeatable from unit to unit. Secondary considerations are self-heating of the coils (which lowers the torque), and the wear capabilities of the bearings and elastomeric stops.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An actuator comprising:
  a rotor comprising a rotor shaft,
  an electromagnetic, circuit configured to produce bidirectional torque on the rotor;
  a rotation limitation assembly comprising:
    at least one stationary clockwise boundary configured to limit clockwise rotation of the rotor;
    at least one stationary counterclockwise boundary configured to limit counterclockwise rotation of the rotor; and
  a rotor stop arm connected to the rotor and configured to selectively abut the clockwise boundary and the counterclockwise boundary and thereby limit the rotation of the rotor to a predetermined angle about an axis of the rotor shaft;
  wherein the at least one stationary counterclockwise boundary and the at least one stationary clockwise boundary each comprise a first rebound dampening means; and
  wherein the rotor stop arm comprises at least one clockwise leading surface and at least one counterclockwise leading surface, wherein both the clockwise leading surface and the counterclockwise leading surface comprise a second rebound dampening means, and is the first rebound dampening means and the second rebound dampening means are configured and positioned for an at least partially embedding relationship.

2. The apparatus of claim 1, wherein the first rebound dampening means comprises a protrusion and the second rebound dampening means comprises an elastomeric pad.

3. The apparatus of claim 1, wherein the first rebound dampening means comprises an elastomeric pad and the second rebound dampening means comprises a protrusion.

4. The apparatus of claim 1, wherein the rotor, the at least one stationary clockwise boundary, and the at least one stationary counterclockwise boundary are configured whereby the predetermined angle is about twenty-nine degrees.

5. The apparatus of claim 1, wherein the electromagnetic circuit is a direct current electromagnetic circuit comprising at least one coil arranged about at least one pole, the at least one coil being alternately polarized to alternately induce torque in the clockwise direction and the counterclockwise direction.

6. An actuator comprising:
a rotor comprising a rotor shaft;
an electromagnetic circuit configured to produce bidirectional torque on the rotor;
a rotation limitation assembly comprising:
two stationary counterclockwise boundaries configured to limit clockwise rotation of the rotor;
two stationary clockwise boundaries configured to limit counterclockwise rotation of the rotor; and
a rotor stop arm connected to the rotor and configured to selectively abut the clockwise boundary and the counterclockwise boundary and thereby limit the rotation of the rotor to a predetermined angle about an axis of the rotor shaft;
wherein the rotor stop arm comprises:
an elongated arm member comprising an arm first segment extending laterally on a first side of the rotor and an arm second segment extending laterally on a second side of the rotor;
two clockwise leading surfaces, a first of the clockwise leading surfaces being on the arm first segment and a second of the clockwise leading surfaces being on the arm second segment;
two counterclockwise leading surfaces, a first of the counterclockwise leading surfaces being on the arm second segment and a second of the counterclockwise leading surfaces being on the arm first segment.

7. The apparatus of claim 6, wherein one of the stationary counterclockwise boundaries and one of the two stationary clockwise boundaries are provided as wall segments of an interior wall on a boundary member, wherein the wall segments comprising the stationary counterclockwise boundary and the stationary clockwise boundaries collectively have essentially a "V" shape, wherein an arcuate segment of the interior wall of the boundary member is provided intermediate the wall segments comprising the stationary counterclockwise boundary and the stationary clockwise boundaries, and wherein the arcuate segment of the interior wall provides a concavity relative to the "V" shape for rotatably accommodating the rotor stop arm.

8. The apparatus of claim 6, wherein:
each of the boundaries comprises first rebound dampening means;
wherein the rotor stop arm comprises:
a clockwise leading surface on the arm first segment;
a counterclockwise leading surface on the arm first segment;
a clockwise leading surface on the arm second segment;
a counterclockwise leading surface on the arm second segment;
wherein each leading surface comprises second rebound dampening means, and wherein the first rebound dampening means and the second rebound dampening means are configured and positioned for an at least partially embedding relationship.

9. The apparatus of claim 6, wherein the rotor, the two stationary clockwise boundaries, and the two stationary counterclockwise boundaries are configured whereby the predetermined angle is about twenty-nine degrees.

10. The apparatus of claim 6, wherein the electromagnetic circuit is a direct current electromagnetic circuit comprising at least one coil arranged about at least one pole, the at least one coil being alternately polarized to alternately induce torque in the clockwise direction and the counterclockwise direction.

11. An actuator comprising:
a rotor comprising a rotor shaft;
an electromagnetic circuit configured to produce bidirectional torque on the rotor;
a rotation limitation assembly comprising:
at least one stationary clockwise boundary configured to limit clockwise rotation of the rotor;
at least one stationary counterclockwise boundary configured to limit counterclockwise rotation of the rotor; and
a rotor stop arm connected to the rotor and configured to selectively abut the clockwise boundary and the counterclockwise boundary and thereby limit the rotation of the rotor to a predetermined angle about an axis of the rotor shaft;
a position sensor assembly configured to sense rotational position of the rotor shaft, the position sensor assembly comprising:
a magnet assembly carried by the rotor shaft;
a magnetic field sensor;
the magnet assembly being configured to provide a north polarized face or a south polarized face to the magnetic field sensor in accordance with the rotational position of the rotor shaft;
wherein the magnetic field sensor is configured to generate a bi-stable output signal in accordance with polarization detected from the magnet assembly, the bi-stable output being for use by the electromagnetic circuit for producing the bidirectional torque.

12. The apparatus of claim 11, further comprising a sensor carrier upon which the magnetic field sensor is mounted, and wherein the sensor carrier is configured to be adjustably positioned about the axis of the rotor shaft to permit calibration of a switching point of the bi-stable output of the magnetic field sensor relative to the rotational position of the rotor shaft.

13. The apparatus of claim 12, further comprising a magnet assembly carrier upon which the magnet assembly is mounted, and wherein the magnet assembly carrier is keyed to the rotor shaft.

14. The apparatus of claim 11, wherein the rotor, the at least one stationary clockwise boundary, and the at least one stationary counterclockwise boundary are configured whereby the predetermined angle is about twenty-nine degrees.

15. An actuator comprising:
a rotor comprising a rotor shaft;
an electromagnetic circuit configured to produce bidirectional torque on the rotor;
a rotation limitation assembly configured to limit rotation of the rotor to a predetermined angle about an axis of the rotor shaft;
a position sensor assembly configured to sense rotational position of the rotor shaft, the position sensor assembly comprising:
a magnet assembly carried by the rotor shaft;
a magnetic field sensor;
the magnet assembly being configured to provide a north polarized face or a south polarized face to the magnetic field sensor in accordance with the rotational position of the rotor shaft;

wherein the magnetic field sensor is configured to generate a bi-stable output signal in accordance with polarization detected from the magnet assembly, the bi-stable output being for use by the electromagnetic circuit for producing the bidirectional torque.

16. The apparatus of claim 15, further comprising a sensor carrier upon which the magnetic field sensor is mounted, and wherein the sensor carrier is configured to be adjustably positioned about the axis of the rotor shaft to permit calibration of a switching point of the bi-stable output of the magnetic field sensor relative to the rotational position of the rotor shaft.

17. The apparatus of claim 16, further comprising a magnet assembly carrier upon which the magnet assembly is mounted, and wherein the magnet assembly carrier is keyed to the rotor shaft.

18. A method of operating an actuator, the method comprising:

using an electromagnetic circuit to rotate a rotor in bidirectional manner by application of bidirectional torque to the rotor, the bidirectional torque being generated by switching direction of current in the electromagnetic circuit;

limiting an extent of rotation of the rotor by providing at least one boundary member against which the rotor abuts when the rotor has rotated to a predetermined boundary angle;

dampening rebound of the rotor upon the rotor abutting the boundary member by:
sensing rotational position of the rotor; and
controlling the switching of direction of the current in response to the rotational position.

19. The method of claim 18, wherein dampening rebound of the rotor further comprises providing rebound dampening means on the rotor and the boundary member.

* * * * *